Sept. 23, 1969  N. J. FRANZ  3,468,096
METHOD OF INTERPOSING A WASHING COMPOUND BETWEEN SUPERPOSED
LAYERS OF NONWOVEN FIBROUS MATERIAL
AND SEALING SAID LAYERS
Filed Feb. 8, 1966  2 Sheets-Sheet 1
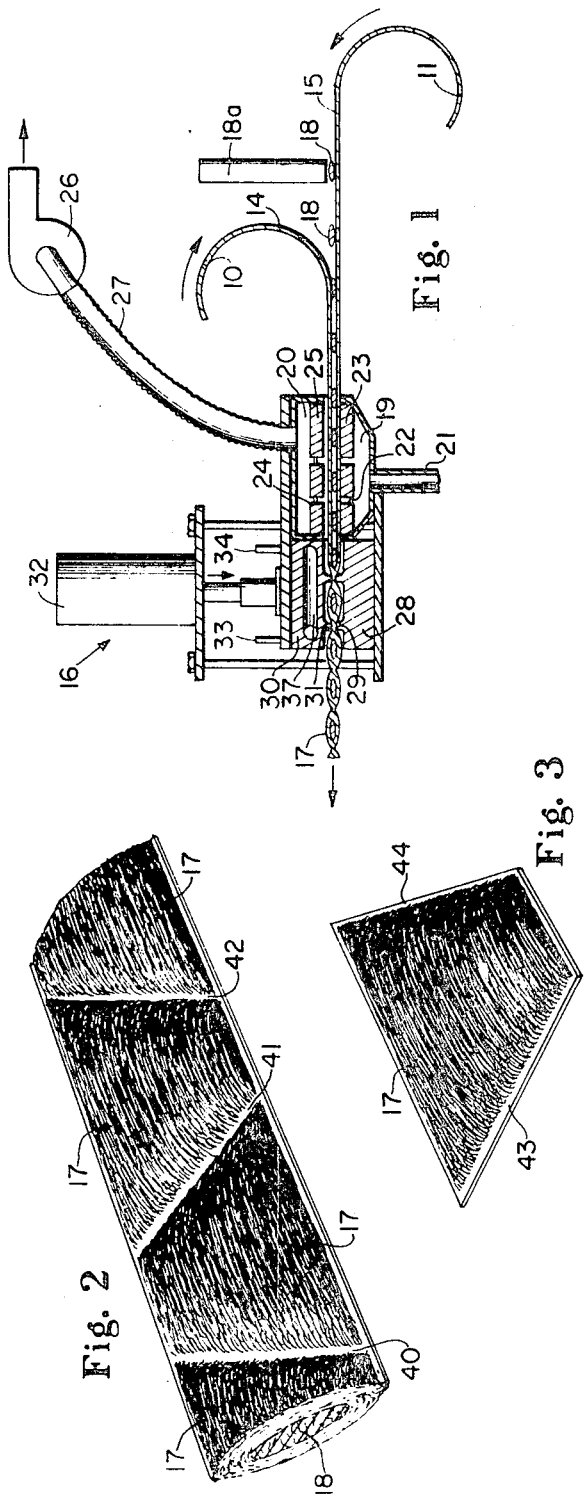
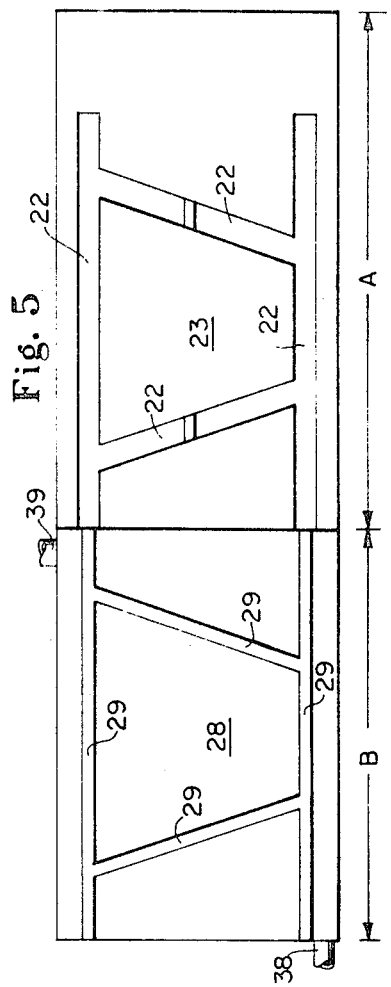
INVENTOR.
Norman J. Franz
BY Fredrick H. Brown
ATTORNEY INVENTOR.
Norman J. Franz BY Fredrick H. Braun

ATTORNEY

United States Patent Office 3,468,096
Patented Sept. 23, 1969

3,468,096
METHOD OF INTERPOSING A WASHING COMPOUND BETWEEN SUPERPOSED LAYERS OF NONWOVEN FIBROUS MATERIAL AND SEALING SAID LAYERS
Norman J. Franz, Colerain Township, Hamilton County, Ohio, assignor to The Procter & Gamble Company, Cincinnati, Ohio, a corporation of Ohio
Filed Feb. 8, 1966, Ser. No. 525,947
Int. Cl. B65b 9/04
U.S. Cl. 53—28      3 Claims

ABSTRACT OF THE DISCLOSURE

Scouring pads or like articles are made by interposing a washing compound between superposed layers of nonwoven fibrous material. At least the surface fibers of the fibrous material are coated with a heat sealable resin. A hot gas is passed transversely through the superposed layers in a desired sealing pattern surrounding the washing compound. The hot gas raises the temperature of the resin in the sealing pattern beyond its fusion temperature whereupon the area is compressed until the resin coalesces thereby forming a seal joining the two layers.

---

This invention relates to a method and apparatus for joining layers of nonwoven fibrous material. The method and apparatus are particularly useful in the manufacture of cleaning and/or scouring pads although the scope of the invention is not limited to such specific utilization. More particularly, the invention is concerned with a two-step process and an apparatus for practicing said process whereby individual layers of nonwoven fibrous material can be bonded together in predetermined patterns or seams.

Heretofore, it has been difficult to continuously process and form permanent heat seal areas between superposed layers of nonwoven fibrous material wherein the fibers are randomly arranged and coated with a heat-sealable resin. This is especially difficult to carry out at relatively high speeds in order to make the manufacture of products from such materials commercially feasible. For example, if heated sealing jaws are used to heat seal an area between superposed layers of the nonwoven fibrous material, the heat-sealable resin on the surface of the fibers will tend to stick to the die faces unless a special nonsticking coating is used thereon.

Furthermore, the use of heated sealing dies results in an inefficient, commercially nonfeasible low speed operation. This results from the dwell time needed in the operating cycle to hold the layers of nonwoven fibrous material in compression as the heat-sealable resin is first heated beyond its fusion temperature and then coalesces to form a permanent heat seal to prevent separation of the layers when the dies are moved apart. It has also been found that the use of heated dies acting directly on nonwoven fibrous material results in a relatively weak seal because of low heat transfer coefficients which prevent heat from being conducted efficiently to the interior portions of the fibrous material.

In view of the above, it is a paramount object of the present invention to provide a method and apparatus for joining nonwoven fibrous material in an efficient manner such that the production of scouring pads and like articles from this material is commercially feasible.

Another object of the invention is the provision of a method and apparatus for joining nonwoven fibrous material without the use of heated die surfaces thereby eliminating the possibility of any material sticking to the die faces.

Still another object of the invention is the provision of a unique method and apparatus for heating and sealing superposed layers of nonwoven fibrous material without excessive time delays to achieve an efficient high speed operation.

A further object of the invention is the provision of a method and apparatus having a reduced time cycle for the production of articles which require heat sealing of layers of nonwoven fibrous material. The time cycle reduction is achieved by improved heat transfer efficiency and consequent faster sealing in the seal area.

The nature and substance of the invention can be brifly summarized as comprising a method and apparatus for sealing superposed layers of nonwoven fibrous material. The method and apparatus are particularly useful and preferably applicable to the formation of cleaning and/or scouring pads and like products wherein at least one of the two superposed layers of nonwoven fibrous material has at least the surface of its fibers coated with a heat-sealable resin. The two layers are superposed with the coated fiber surface of the one layer being juxtaposed with the surface of the other layer. A hot gas is passed through the superposed layers in a pattern corresponding to the desired sealing pattern, the temperature of the gas being sufficient to fuse the heat-sealable resin in the sealing pattern and desired heat seal area. The sealing area of the juxtaposed layers are then compressed for a brief interval until the resin coalesces thereby joining the layers in the desired sealing pattern. The joined layers can thereafter be trimmed or separated at the heat seal area to complete the formation of an article.

Preferably, the invention is practiced in the formation of cleaning and/or scouring pads having a cake of washing composition interposed between the layers of nonwoven fibrous material before they are sealed together. In the preferred practice, the washing composition is entirely surrounded and enclosed by the heat seal area of the sealing pattern so that the finished cleaning and/or scouring pad has the washing composition centrally enclosed.

The nonwoven fibrous material used in making cleaning and/or scouring pads preferably comprises nonabsorbent, nonmatting fibers of various lengths which can range from about one-half inch to two inches. The fibers are adhered to each other in three-dimensional, random arrangement. The thrdee-dimensional random arrangement of fibers provides many advantages in loft and resilience, but it will be understood that the nonwoven fibrous material used in the practice of the present invention may vary from such fiber arrangement so long as any other fiber arrangement has the advantages inherent from the use of the desired material possessing the preferred fiber arrangement.

The nonwoven fibrous material may comprise synthetic fibers, metallic fibers, or various animal or vegetable fibers, either alone or in various combinations. The metallic fibers that may be used, either alone or in combination with other fibers, include steel wool and stainless steel fibers. Particularly preferred are the synthetic fibers. The most satisfactory synthetic fibers are the thermoplastic synthetic fibers and include those made of nylon (e.g., polyhexamethyleneadipamide, polycaprolactam, and the like), polypropylene, polyester fibers (e.g., polyethylene terephthalate, and the like, rayon, cellulose acetate, modacrylic fiber (a copolymer of vinyl chloride and acrylonitrile) commercially available under the trademark Dynel, acrylic fiber (formed from a polymer of acrylonitrile) such as commercially available under the trademarks Orlon and Acrilan, polyvinylidene chloride-polyvinyl chloride copolymer fibers, and the like fibers. The fibers may be curled, crimped and/or straight.

The denier of the fiber used may vary widely, depending upon the results desired. For example, heavy denier undrawn nylon is preferred for use in making coarse pads for rough scouring jobs. For fine scouring jobs the nylon may be of lighter denier or may be mixed with various soft fibers.

At least the opposite side surfaces of the nonwoven fibrous material are lightly impregnated with adhesive. The amount of adhesive applied, e.g., sprayed, on either surface of the fibrous layer is sufficient to bond the fibers together so as to form a self-sustaining layer of material when it is cut into a suitable size. The amount of adhesive is preferably sufficient to cause concentration of the adhesive at the area of the surface of the layer than in the center or middle of the layer. This is achieved by employing an amount of resin which preferably avoids penetration of substantial amounts of adhesive to the center or middle of the layers. The bonding of the fibers prevents them from pulling out and thereby insures dimensional stability of the layer for a much longer period of time than is possible with unbonded fibers.

Moreover, the concentration of adhesive at the surface coupled with heat sealing superposed layers of the material in selected areas, results in reduced adhesive needs to effect adequate interbonding of the fibers so as to avoid shredding of and distortion of material when formed into cleaning and/or scouring pads. Heat sealing selected areas of the fibrous layers brings the side edges together into a terminating thin peripheral edge for the finished product.

It is also possible, if desired, to use an adhesive which will penetrate to the center or middle of the layer such that the layer is substantially uniformly coated throughout with the adhesive material. By way of example, a fibrous material in which the adhesive is substantially uniformly distributed is described in U.S. Patent 2,784,132 issued to Emanuel N. Maisel on Mar. 5, 1957. The disclosure of the Maisel patent is incorporated herein by reference with respect to its teachings on adhesive-bonded nonwoven fibrous materials.

The adhesive may comprise any fusible adhesive material, resinous or otherwise, which will fuse under heat and coalesce to bind the fibrous material into a unitary pad. Such resins may be employed to form the heat seal areas. Examples of thermoplastic adhesives which may be used are polyvinyl alcohol, polyvinyl chloride or polyvinyl acetate or the copolymers thereof, and natural resinous adhesive materials such as rosin, and the like. It is also possible to use a rubbery adhesive binder composition such as butadiene-acrylonitrile copolymer latex having about 60 parts butadiene to 40 parts acrylonitrile, sold commercially by B. F. Goodrich Company under the tradename Hycar Latex 1561 and cured to a stable resilient rubbery condition.

Both surfaces of the fibrous layer may be sprayed with the same adhesive. However, if any scouring action is desired, the surface of the fibrous layer that eventually becomes the outer surface of a cleaning and/or scouring pad is preferably sprayed with an adhesive in which grit is embedded.

It is also possible to use a fibrous material of the type disclosed in U.S. Patent 2,958,593 issued to Howard L. Hoover et al. on Nov. 1, 1960, in which abrasive particles are adhered and distributed uniformly throughout the fibrous material. The disclosure of the Hoover et al. patent is incorporated herein by reference with respect to its teachings on adhesive-bonded nonwoven fibrous material.

The scouring action depends upon the size of grit contained in the adhesive, the type of fiber, and the denier of fiber used. Silicon carbide and aluminum oxide are examples of suitable grit.

While the specification concludes with claims particularly pointing out and distinctly claiming the subject matter regarded as forming the present invention, it is believed the invention will be better understood from the following description taken in connection with the accompanying drawings in which:

FIGURE 1 is an elevation partially in cross section which diagrammatically illustrates the method and apparatus for continuously manufacturing cleaning and/or scouring pads with the important elements of the apparatus being shown in sufficient detail to permit a full understanding of same.

FIGURE 2 is a perspective view showing a series of joined scouring pads prior to separation along the transverse seams to form individual scouring pads.

FIGURE 3 is a perspective view of an individual scouring pad formed by the method and apparatus of the present invention.

FIGURE 5 is a plan view taken on the line 5—5 of FIGURE 4 showing the die face of the sealing station and the air slots of the heater station in normal side-by-side relation.

Figure 4:
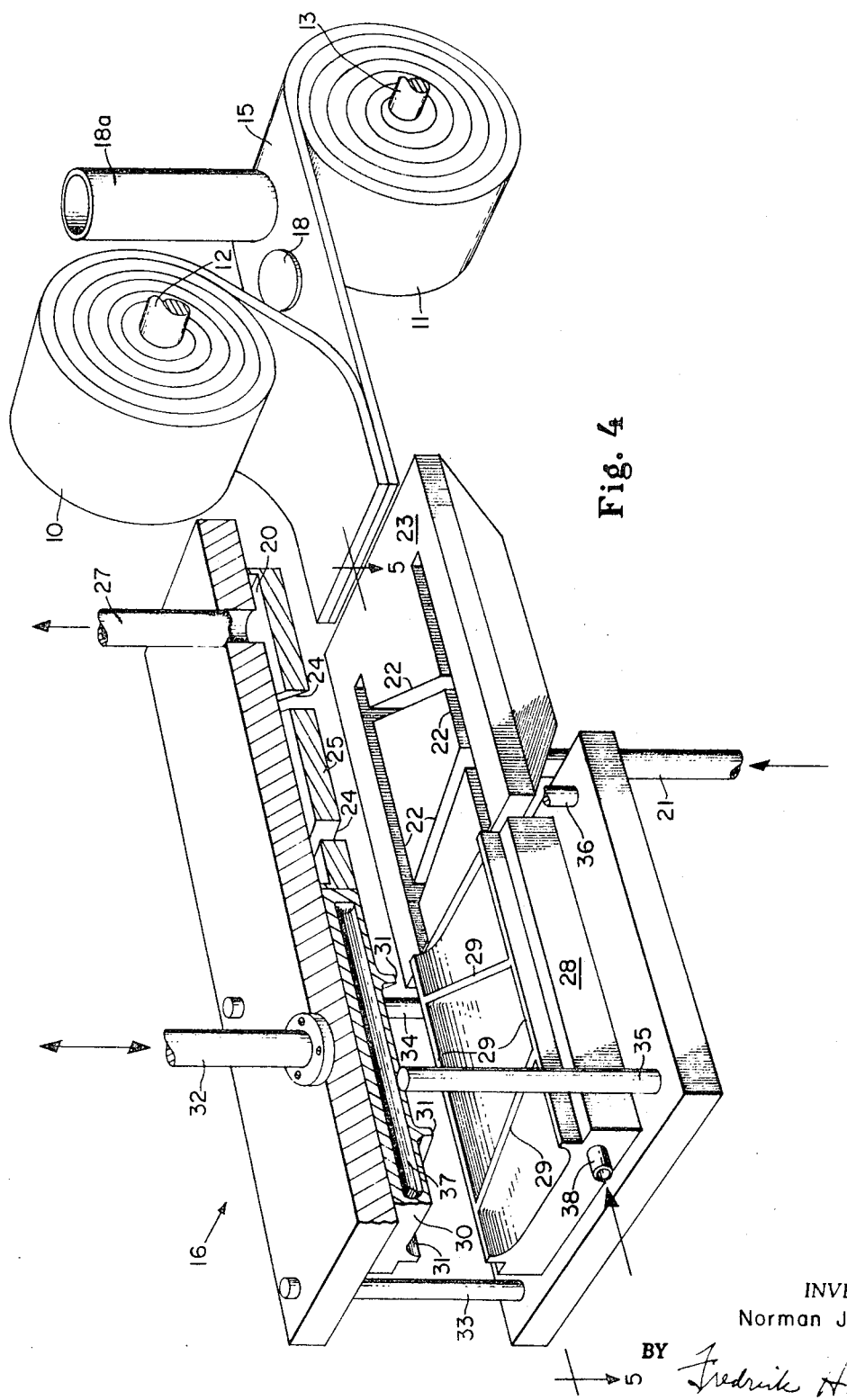
FIGURE 4 is a perspective view of an apparatus partially broken away to show the principal operative comnonents used in the practice of the invention.

The present method and apparatus is particularly well suited in forming cleaning and scouring pads of the type generally illustrated and described in U.S. Patent 3,175,-331, issued on Mar. 30, 1965, to Joseph J. Klein. In fact, the method and apparatus are designed to make pads of that type but of a different configuration.

Referring now to the drawings and particularly FIGURES 1 and 4, it will be noted that a pair of continuous webs 10 and 11 of nonwoven fibrous material are separately supported on the spindles 12 and 13, respectively. Each web is preferably formed of synthetic fibers as previously described in detail. The faces 14 and 15 of the respective webs 10 and 11 are brought together into edgewise alignment prior to the sealing operation. A heat-sealable resin has previously been applied to either or both of the surfaces 14 and 15, e.g., by spraying, to permit heat sealing of these surfaces after they are brought into superposed relation. The webs 10 and 11 are intermittently withdrawn from the spindles 12 and 13 and fed to the heat sealing apparatus denoted generally at 16.

It will be noted in FIGURE 3 that the finished cleaning and/or scouring pad 17 is preferably trapezoidal in shape. As a consequence, the present method and apparatus are directed to the formation of pads of this configuration. It is to be understood, however, that the outline shape of the pad 17 is immaterial in practicing the method and apparatus of this invention.

In the formation of cleaning and/or scouring pads of the type disclosed in the Klein patent, a tablet of washing compound in the form of small bars 18 (FIGURE 1) is intermittently deposited on the face 15 of the web 11. This is done by means of the dispenser 18a which is of conventional design and is synchronized with the movement of the web 11 such that the bars 18 are deposited at predetermined spaced intervals. The washing compound of the bars 18 is preferably a solid cake of soap or detergent material but it may be in the form of flakes, pellets or granules.

The webs 10 and 11 are sealed around each successive bar 18. This is performed in the heat sealing apparatus 16 which, generally speaking, is in the form of a two-station reciprocating press. The press is divided into a heater station and a sealing station.

The heater station comprises a lower plenum 19 and an upper plenum 20. A hot gas under pressure and at a temperature sufficiently high to raise the heat-sealable resin to its fusion temperature is introduced through the inlet conduit 21 to the lower plenum 19. The hot gas is preferably heated air at a temperature in excess of 350° F. which can be heated by conventional means and supplied to the conduit 21. Other gases may be used particularly those which are inert with respect to the materials of the webs 10 and 11.

A patterned narrow gas passage 22 is provided in the block 23. The outline shape of the passage 22 is shown in FIGURES 4 and 5. The passage 22 is in the configuration of the desired peripheral heat seal pattern of the finished pad 17. A corresponding gas passage 24 is formed in the block 25. The passage 24 is in vertical alignment with the passage 22 so that the hot gas introduced under pressure in the lower plenum 19 passes through the superposed webs 10 and 11, in the desired heat seal pattern to the upper plenum 20. Thereupon the gas is withdrawn from the upper plenum 20 by means of the exhaust blower 26 through the flexible tube 27 such that slight negative pressure exists in the upper plenum 20.

The finished heat seals for the superposed webs 10 and 11 are formed by compression at the sealing station of the apparatus 16 after initial heating in the heater station. As shown in FIGURES 1 and 4, the sealing station comprises a lower die 28 having an upwardly raised die face 29. The raised die face 29 (see also FIGURE 5) is in the desired sealing pattern and corresponds in configuration to the gas passage 22 in the block 23. Similarly, the upper die 30 has a downwardly raised die face 31 which corresponds in configuration to the die face 29. A double-acting air cylinder 32 is provided to raise and lower the die 30 and block 25 on each cycle there being guide pins 33, 34, 35 and 36 (FIGURE 4) to maintain the alignment of the upper and lower dies and blocks. The die faces 29 and 31 exert a compressive force on the sealing pattern of at least 800 pounds per square inch and preferably about 1000 pounds per square inch.

Coolant passages 37 as seen in FIGURES 1 and 4 are preferably provided in the upper die 30. A similar coolant passage (not shown) is preferably provided in the lower die 28, the inlet 38 of which is shown in FIGURES 4 and 5 and the outlet 39 of which is shown in FIGURE 5. The coolant passages are not essential but are preferably provided to maintain the die faces 29 and 31 at a relatively low temperature in order to accelerate the speed with which the heat-sealable resin coalesces under compression to join the webs 10 and 11 in the desired pattern.

In operation the webs 10 and 11 are moved intermittently into the heat sealing apparatus 16 in superposed relation. The bars 18 are deposited on the face 15 at predetermined intervals. The assembled webs and bars 18 come to rest periodically in the position shown in FIGURE 1 whereupon hot gas fed to the plenum 19 is passed from the passage 22 to the passage 24 and thus through the superposed webs 10 and 11 in a predetermined pattern. The gas is heated sufficiently to cause fusion of the heat-sealable resin coating on the fibrous web material.

As a next step the dies 28 and 30 as well as the blocks 23 and 25 are separated by the double-acting cylinder 32. The webs 10 and 11 are then moved forward a distance such that the heated pattern comes into alignment with the opposed die faces 29 and 31 at the sealing station. The air cylinder 32 thereupon lowers the upper die 30 and block 25 such that the die faces 29 and 31 compress the two webs 10 and 11 in the desired sealing pattern corresponding to the pattern previously heated at the heater station. Simultaneously, the web material 10 and 11 between the blocks 23 and 25 is heated preparatory to its being moved to the sealing station on the next cycle. When the cylinder 32 next raises the die 30 and block 25, the web material 10 and 11 between the dies 30 and 28 is permanently formed into a continuous pattern as shown in FIGURE 2.

FIGURE 5 illustrates a plan view of the lower die 28 and the block 23. It will be noted that the pattern of the passage 22 in the block 23 is identical to the pattern of the raised die face 29. The longitudinal dimension A defining the length of the passage 22 is exactly equal to the longitudinal dimension B defining the length of the raised die face 29. The dimensions A and B are also equal to the indexing distance of each cycle of the apparatus. This arrangement of the passage 22 and die face 29 makes it possible to seal all of the material of the webs heated at the first or heater station on the subsequent cycle at the second or sealing station. It will also be noted that the heating and sealing patterns are such that congruous pads 17 are made continuously although each adjoining pad is inverted with respect to the pad on either side.

In the present embodiment, two pads are formed on each cycle of the cylinder 32. It will be apparent, however, that the passage 22 and die face 29 can be extended or otherwise modified to make four or six or more aligned pads per cycle (an even number of aligned pads must be formed in the case of the trapezoidal shapes previously described). It is also possible to modify the passage 22 and die face 29 to produce two or more contiguous rows of pads 17 if desired. Of course, whenever the passage 22 and die face 29 are modified for any reason, it will be understood that the passage 24 will be modified to be identical in configuration to the passage 22 and the die face 31 will be modified to be identical to the die face 29.

While the invention has been described in the joining of separate layers of nonwoven fibrous material, it is not so limited. For example, similar results can be achieved by folding over a single layer such that the fold forms one side edge of the pad and the other three sides of the pad are formed with heat seals.

What is claimed as new is:

1. A method of making washing and scouring pads from nonwoven fibrous material wherein the fibers of at least one of the opposed surfaces is coated with a heat-sealable resin comprising the steps of feeding a pair of spaced webs of the nonwoven fibrous material into superposed position, interposing a tablet of washing compound at spaced intervals between said webs, passing a hot gas transversely through the superposed layers of nonwoven fibrous material in a pattern corresponding to the sealing pattern desired, locating said sealing pattern such that successive tablets of said washing compound are surrounded thereby, the temperature of said hot gas being sufficient to raise the heat-sealable resin in said sealing pattern beyond its fusion temperature, thereafter compressing the webs in the area of the sealing pattern until the heat-sealable resin coalesces thereby joining the two layers in the desired sealing pattern and enclosing the tablet of washing compound.

2. A method of making washing and scouring pads as claimed in claim 1 including the step of passing hot air at a temperature in excess of 350° F. through said superposed layers of nonwoven fibrous material in a pattern which is in the form of a trapezoid surrounding one of said tablets.

3. A method of making washing and scouring pads as claimed in claim 2 including the step of moving said webs intermittently from a first position where they have been heated in the desired sealing pattern to a second position where the heated sealing pattern is compressed until the heat-sealable resin coalesces to join the layers in the desired pattern.

References Cited

UNITED STATES PATENTS

| 3,284,963 | 11/1966 | Lanham et al. | 15—104.93 |
| 3,322,584 | 5/1967 | Welin-Berger | 156—88 XR |
| 3,172,796 | 3/1965 | Gulker | 156—290 XR |
| 2,503,518 | 4/1950 | Slaughter | 156—243 |

EARL M. BERGERT, Primary Examiner

P. DIER, Assistant Examiner

U.S. Cl. X.R.

15—104.93; 53—180; 156—82, 290, 553, 581; 401—201